United States Patent [19]

Sheets

[11] 4,007,987
[45] Feb. 15, 1977

[54] VACUUM CONTACT PRINTING SYSTEM AND PROCESS FOR ELECTRONIC CIRCUIT PHOTOMASK REPLICATION

[75] Inventor: Ronald E. Sheets, Westminster, Calif.

[73] Assignee: Tamarack Scientific Co., Inc., Orange, Calif.

[22] Filed: Jan. 12, 1976

[21] Appl. No.: 648,209

[52] U.S. Cl. .............................. 355/91; 355/132
[51] Int. Cl.² ........................................ G03B 27/20
[58] Field of Search ............. 355/91, 93, 94, 78, 355/132, 133

[56] References Cited
UNITED STATES PATENTS

| | | | |
|---|---|---|---|
| 3,604,800 | 9/1971 | Jordan et al. | 355/132 X |
| 3,645,622 | 2/1972 | Cochon et al. | 355/132 |
| 3,858,978 | 1/1975 | Johannsmeir | 355/79 |

OTHER PUBLICATIONS

"Mask to Mask Contact Printer," H. Rottmann et al., *IBM Tech. Bull.*, vol. 14, No. 10, Mar. '72, p. 2912.

*Primary Examiner*—R. L. Moses
*Attorney, Agent, or Firm*—Forrest J. Lilly

[57] ABSTRACT

There is disclosed a vacuum contact printer and process for printing copy plates from master photomask plates depicting electronic circuitry.

The printer embodies a vacuum-tight enclosure or casing, containing three vacuum chambers, two outside master and copy plate plenum chambers, and an intermediate main chamber. Retainers for the master and copy chambers hold and frame the master photomask and copy plates, respectively, and these retainers are mounted in confronting printing frames. The one of these printing frames which supports the master photomask plate is carried by a mounting plate fixed to an outside casing, and the other of the printing frames is carried by a swinging door of this casing. The master and copy photomask plates form partitions across the interior of the casing, and are positioned against flexible elastomeric framing seals, which complete these partitions. The photomask plates and their seals thus form two outside plenum chambers and one intermediate plenum chamber, and can be evacuated, and repressurized, in various ways to cause the two photomask plates, which are normally in contact, to separate by a small distance, such as 0.040 inch, or to softly contact one another, or do so under substantial pressure, for contact printing.

16 Claims, 10 Drawing Figures

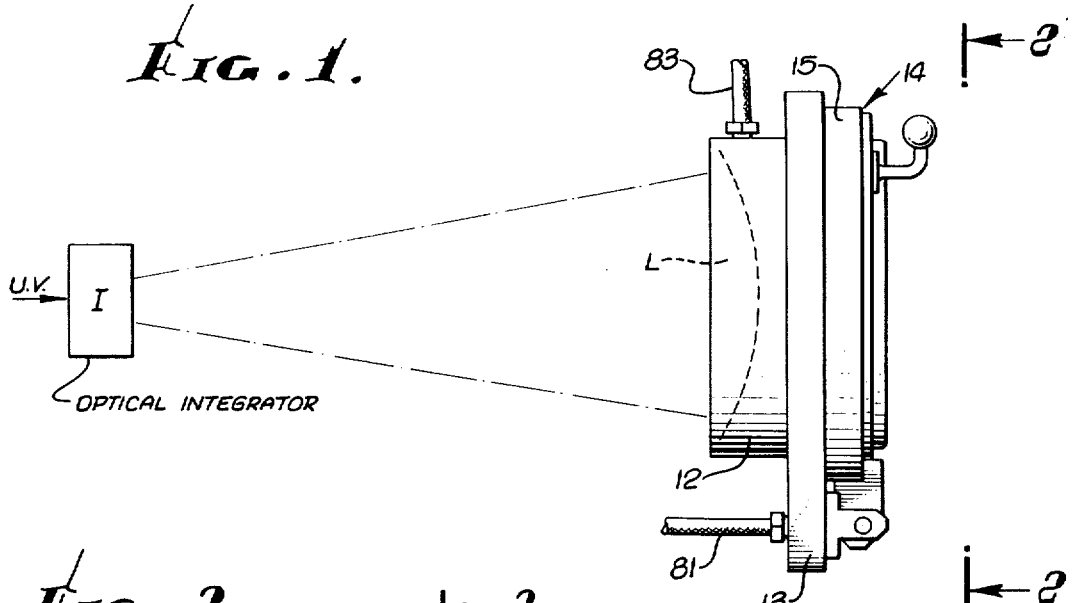
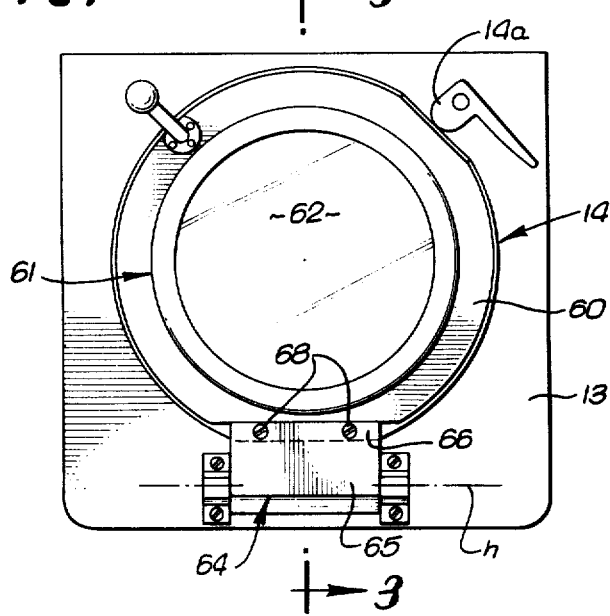
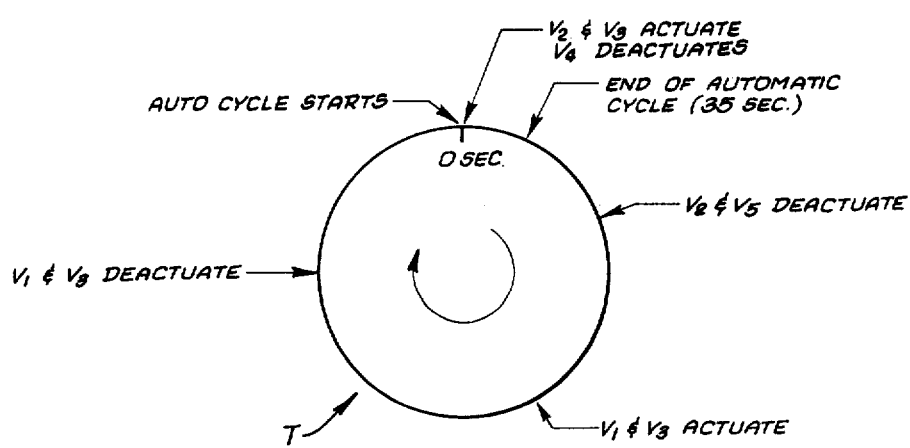

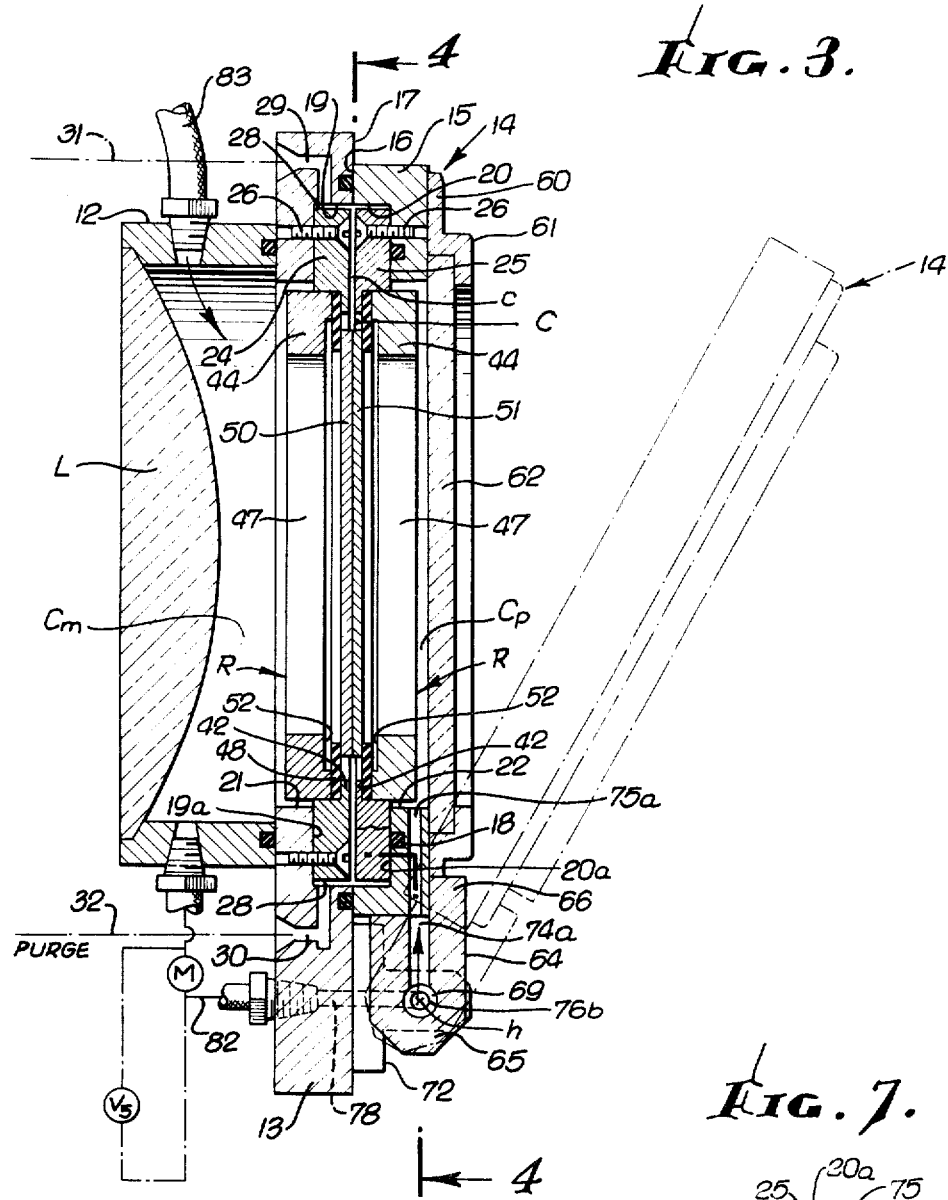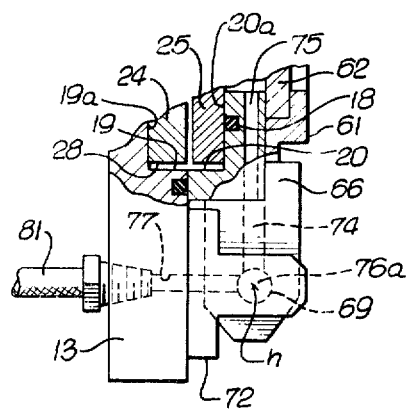

VACUUM CONTACT PRINTING SYSTEM AND PROCESS FOR ELECTRONIC CIRCUIT PHOTOMASK REPLICATION

FIELD OF THE INVENTION

This invention relates to the art of contact printing electronic circuit photomasks, in sizes such as 2 × 2 inches to 5 × 5 inches.

BACKGROUND OF THE INVENTION

The photomasks are typically made from high precision, 0.060 inch thick soda-lime glass plates. Customarily, the clear glass is placed in a vacuum chamber, wherein a thin layer of chrome is evaporated onto its surface. A thin layer of photoresist is then applied, using well-known technique. The copy plate thus prepared is then contact printed from a master mask on a similar glass plate, generated by other means, all in usual fashion.

The basic purpose is to produce, from the master mask, precision copies to be used as working masks. Thus I may refer hereinafter to the master photomask, and to copy photomasks or copies which are to be produced in large number by contact printing from the master.

It is a general purpose of the invention to produce improved, high precision copy masks, in substantial number, at relatively high speed, particularly while avoiding the deterioration of the master mask that is commonly experienced.

BRIEF DISCUSSION OF THE INVENTION

The invention can be adequately described in full detail only in conjunction with the accompanying drawings. However, some basic features of interest may be mentioned at this point.

The master and copy photomasks are mounted in opposition to one another inside an evacuated printer enclosure, the master being mounted in the enclosure, and the copy on a swinging door hinged to a stationary part of the enclosure, and comprising a part thereof. When the door is closed, or is just closing, the master and copy are in opposition to one another, but slightly spaced apart, so they do not contact or scuff on one another during closing. Subsequently, the plates will be sometimes slightly separated, and sometimes in contact. The printer employs a stationary mounting plate, and the hinged door, which swings closed against the mounting plate, and seals thereto around its margin by a suitable neoprene seal. The hinged door is locked closed by a suitable latch. Mounted in countersinks in the confronting mounting plate and door are confronting printing frames. These, which are identical, are fastened to the respective mounting plate and hinged door by screws, and each is apertured to receive a rectangular seal retainer. The seals are in the form of rectangular frames, composed of fabric-reinforced neoprene rubber or other suitable elastomeric substance, adapted to deform resiliently or elastically under compression, or in flexure under bending forces, and to return to initial form when the deforming stress is relieved. Outer marginal edge portions of the seals are tightly confined between opposed faces on the retainers and faces on the printing frames, while the portions of the seals inwardly thereof are freely flexible, and when in substantially unflexed position, contact margins of the master and copy plates. These plates are normally in contact, but may be separated by a distance of approximately 0.040 inch, as presently described, the plates depressing the flexible seal portions directly opposite them, and the separation distance being limited by inset faces on the seal retainers. There are three vacuum chambers, first, that between and around the outside of the two plates, reduced to zero-thickness between the plates part of the time (seals substantially unflexed), and spread to 0.040 inch part of the time (seals depressed to maximum allowable). Second, there is a master plenum chamber in back of the master photomask, with a connection to vacuum. And third, there is a copy plenum chamber in back of the copy plate, with vacuum connections through the hinge, for connections to a source of vacuum, and to the master plenum chamber, the latter including a later-mentioned differential pressure gauge, or a flow rate gauge, and shunting shut-off valve.

With this basic mechanical set-up, and speaking now only generally, vacuums are progressively but rapidly drawn in the control or main chamber, and in the master and copy plenum chambers, with a 2 to 3 inches Hg. advantage in the master and copy plenum chambers over the main chamber. The vacuum differential causes the seals to flex and the plates to separate to the spacing distance of 0.040 inch as mentioned above. These vacuums are drawn, with the 2 to 3 inches Hg. incremental excess in the master and copy plenum chambers over the main chamber, until a maximum of say 25 inches Hg. is reached. This vacuum is very rapidly drawn in the main chamber because of the unique separation distance of the plates in this phase. The vacuum source is made of such capacity that towards the end of this evacuation, it loses its power to provide higher vacuum, and the vacuums in the chambers then gradually equalize at about 25 inches Hg., for example, as full evacuation capacity is reached.

At this point and under these conditions, the master photomask and copy plates, with lessening and then zero increment of vacuum across them, gradually and gently move into contact.

The vacuum in the main or middle chamber is then held steady, i.e., at 25 inches Hg., for a time, while the master and copy plenum chambers are re-pressurized ("back-filled" with air). A noteworthy feature of the invention is that this re-pressurization can be carried back to 0 inch Hg., or may be, and preferably is, stopped at some selected differential, such as 20 inches Hg. (5 inches less than the maximum, 25 inches Hg., still held in the middle chamber). There is thus, say 5 inches Hg. vacuum less in the master and copy plenums than in the central or main chamber. Accordingly, the plates are then pressed against one another with a contact pressure of 5 inches Hg. This represents "soft contact." Harder contact can be obtained by re-pressurizing to any selected level, up to 0 inch Hg. This "soft contact" feature is novel, and adjustment enables a long range of contact pressures to suit varying conditions or preferences. The master photomask and copy plate are allowed to dwell for a few seconds under the contact pressure thus developed to enable flattening out of the coating of resist until uniformity of contact is achieved.

Following the contact dwell period, the plates are exposed to ultraviolet printing light. For acceptable results, the printing light beam should be a collimated beam, and I preferably use a source and collimator system such as disclosed in my copending application entitled Optical Microcircuit Printing System, Ser. No. 484,564, filed July 1, 1974, now U.S. Pat. No. 3,941,475.

At the end of a predetermined exposure period, the master and copy plenum chambers are again opened and rapidly evacuated to 25 inches Hg., and as a consequence, as will be more fully explained hereinafter, main chamber vacuum falls by a few inches of mercury, about 7 inches Hg. in the case hereinafter illustrated. Thus, the vacuum falls a few inches of Hg. in the chamber C, while rapidly increasing in the master and copy chambers.

Now the vacuum in the main chamber is less, for a few seconds, by about 3 inches Hg., than the vacuum in the master and copy plenum chambers, and with this reversal, the master and copy plates are slowly pulled apart. This separation is maintained for say 3–10 seconds. The vacuums in the master and copy plenum chambers and in the main or center chamber finally equalize. The plates now have no pressure differentials across them, and the only closing force remaining is owing to resilience of the deformed seals. The plates may or may not just barely touch at this time.

Thereafter, the main chamber is re-pressurized (by opening it to atmosphere), and the master and plenum chambers are repressurized, but with a few inches of Hg. differential. The main chamber returns to atmospheric pressure, the master and copy chambers to pressures lower than atmospheric by 3–5 inches Hg. When the door is fully opened, the pressure in the copy chamber returns to atmospheric pressure.

A number of significant advantages are secured in the system of the invention as thus broadly described, and others will appear or be more fully described in the ensuing detailed description of one present illustrative embodiment of the invention as shown in the drawings.

For the time-being, however, some advantages of the invention may be mentioned here. First, there is avoidance of scuffing of the plates on one another as the hinged door that carries the copy plate is closed, owing to the master and copy plates being held separated by vacuum differentials at that time. Second, the master and copy plates are held separated during evacuation of air from the chamber between the plates. Thus, a fast evacuation can be effected without trapping of a bubble of air in between the two plates, such as would prevent good contact of the plates during subsequent printing.

The master and copy plates are gently placed into contact only after the entire chamber has been evacuated. Thus any shifting of plates which might otherwise occur due to mechanical stress created by the vacuum as it is applied to the "main" chamber itself does not affect either the master or copy.

Contact pressure between the master and copy (for copying) is variable from "soft" — say 5 inches Hg., to hard, say 25 inches Hg., satisfying a wide range of demands. The master and copy plates are uniquely free-floating between special flexible seals during the application of the copy pressure.

Additional unique and patentable features and accomplishments of the invention can best be treated or will appear in the course of the ensuing description of a present illustrative embodiment as shown in the drawings.

BRIEF DESCRIPTION OF THE DRAWINGS

In the drawings, showing an illustrative embodiment, partly in mechanical detail, and partly schematically:

FIG. 1 is a side elevational view of the system, omitting the ultraviolet source, shown indicating the optical integrator, which is the immediate source for the collimating lens, only in block diagram;

FIG. 2 is an end elevation taken as indicated by the arrows 2—2 in FIG. 1;

FIG. 3 is a transverse vertical section taken on broken section line 3—3 of FIG. 4;

FIG. 7 is a detail elevation, with parts in section, on line 7—7 of FIG. 4;

FIG. 10 is a diagrammatic view of a valve-actuating timer.

Figure 4:
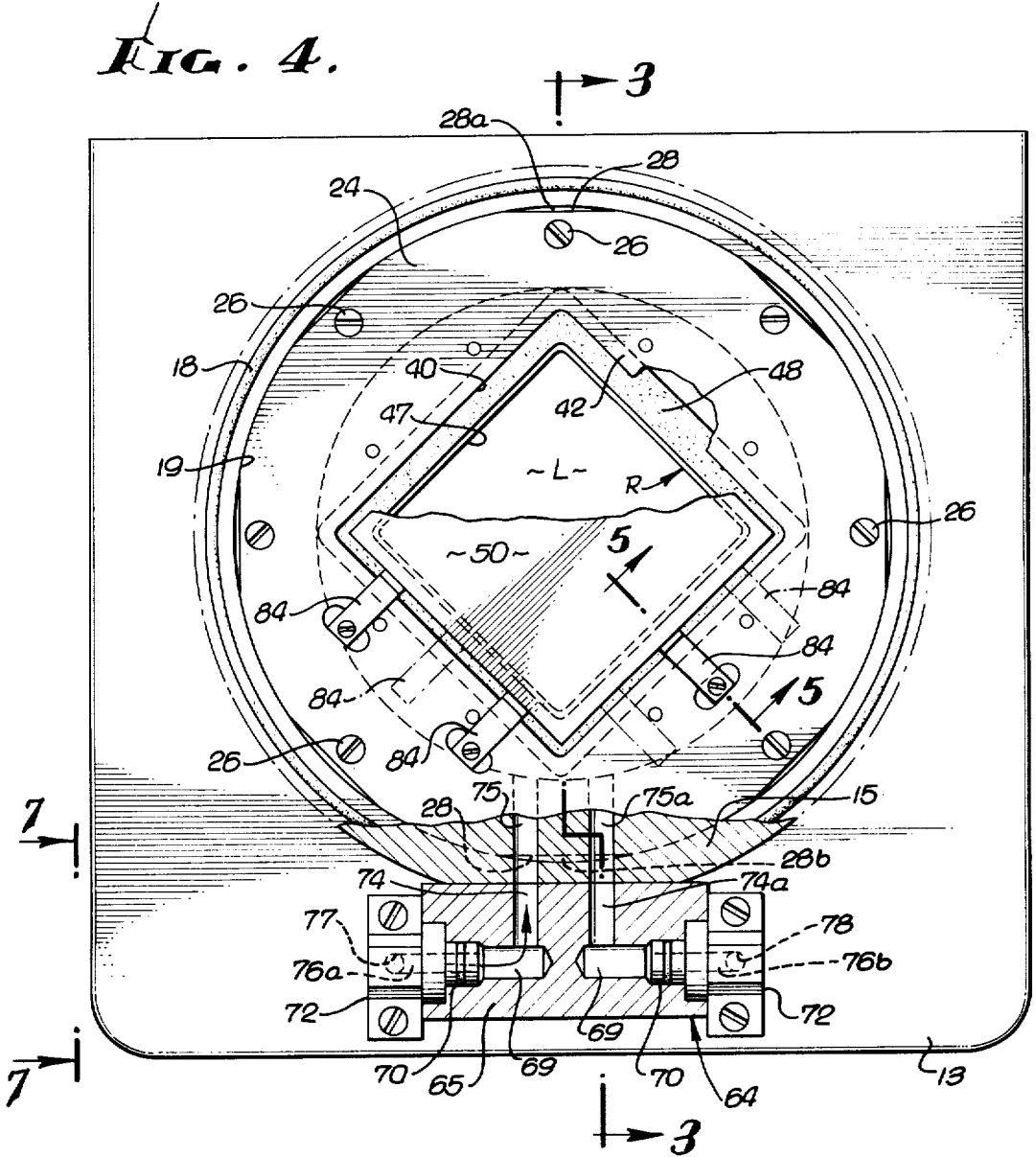
FIG. 4 is a broken vertical section taken on the broken line 4—4 of FIG. 3.

DESCRIPTION OF AN ILLUSTRATIVE EMBODIMENT AND PROCESS IN ACCORDANCE WITH THE INVENTION

Referring first to FIGS. 1 and 2 of the invention, there is shown at I an optical integrator, and at L a collimating lens, of the system of my aforementioned earlier application Ser. No. 484,564. The primary light source is omitted from the drawings but the light from it is represented by the arrow U.V. in FIG. 1. This particular collimating system may be replaced by others, but is preferred at this time because of the exceedingly uniform ultraviolet light it produces at the photomasks, and its unique and valuable adjustability features.

With reference now also to FIGS. 3–7, the collimating lens L is mounted in the back of a lens barrel 12, whose forward end is mounted tightly on a stationarily mounted vertical mounting plate 13, here shown as vertical, but not necessarily so. In this case, the plate 13 is of rectangular outline (FIG. 2).

Next to the mounting plate, and hinged thereto at the bottom, as on a horizontal axis h, is a round door 14, which has a circumscribing door flange 15 faced with a plane surface 16 adapted, when the door is closed, to meet the confronting plane front face 17 of the mounting plate. The surface 16 of door 14 seals, near the periphery of the door, to the front face 17 of the mounting plate by means of an O-ring seal 18 set into the latter. A pivoted latch 14a locks the door closed and sealed. A sealed housing is thus composed of the mounting plate 13, lens barrel 12, and hinged door 14.

Sunk into the confronting faces of the mounting plate 13 and door 14 are identical and matching countersinks 19 and 20, respectively, with annular seats 19a and 20a, respectively, at their bottoms. Opening through the backs of the plate 13 and door 14, inwardly of the inner edges of the seats 19a and 20a, are circular apertures 21 and 22, respectively.

Identical flat and parallel sides, generally circular printing or locating frames 24 and 25 engage the annular seats 19a and 20a, and are fastened to the latter as by screws 26. The thickness dimensions of the mounting plate and door, and of these printing frames 24 and 25, is such that, with the door closed, there is a very thin clearance space c, of a thickness of the order of 0.001-3 inches, (exaggerated in the drawings) between printing frames, serving as an air flow passage, as will be referred to presently.

The generally externally circular printing frames 24 and 25 are relieved in places by edge flats, including those designated 28 at the top and bottom of the frames (FIGS. 3 and 4). Passages 29 and 30 in plate 13 communicate with the segmental spaces 28a and 28b afforded by these flats, and turn to open through the back of plate 13 to connect to a vacuum line 31 and a nitrogen purge line 32, respectively. The segmental spaces 28a and 28b communicate, in turn, via the narrow clearance space c between the printing frames 24 and 25, with the expansive and contractive main chamber space C between and around master and copy plates 50 and 51 mentioned presently. As will be seen later, the plates 50 and 51 are either in contact (normally), or spread apart by a distance of the order of 0.040 inch.

The generally externally circular printing frame plates 24 and 25 have matching rectangular (usually square) apertures 40 therethrough, preferably and as here shown in an orientation with corners at top and bottom (see FIG. 4), and defined by inwardly extending flanges 42 whose front faces are flush with the parallel, almost contacting faces of the frame plates. The back or outer surfaces of the plates engage the aformentioned seats 19a and 20a. The printing plates 24 and 25 will be seen to be recessed in back of the flanges 42 to snugly receive rectangular master and copy photomask plate retainers R·having rectangular frame parts 44, which are apertured at 47 to define the rectangular "sight" aperture for the active areas of the photomasks. An elastomeric seal 48, in the form of a rectangular (preferably square) frame is clamped with an outer marginal part thereof between the back of each printing frame flange 42 and the confronting parallel face 49 of the corresponding retainer part 44, the printing frames and retainers being fastened together as will presently appear. These rectangular seals have flexible or resilient lip portions projecting inwardly from the clamped portions thereof, as illustrated in FIGS. 3, 5 and 6.

Figure 6:
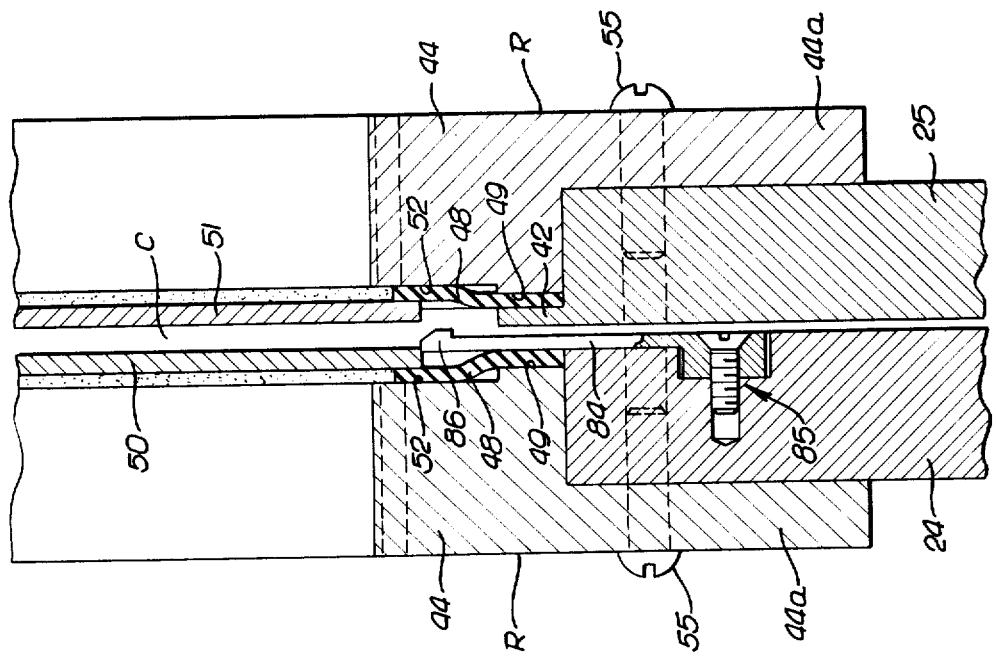
FIG. 6 is a view similar to FIG. 5, but with the photomask plates separated.
Figure 5:
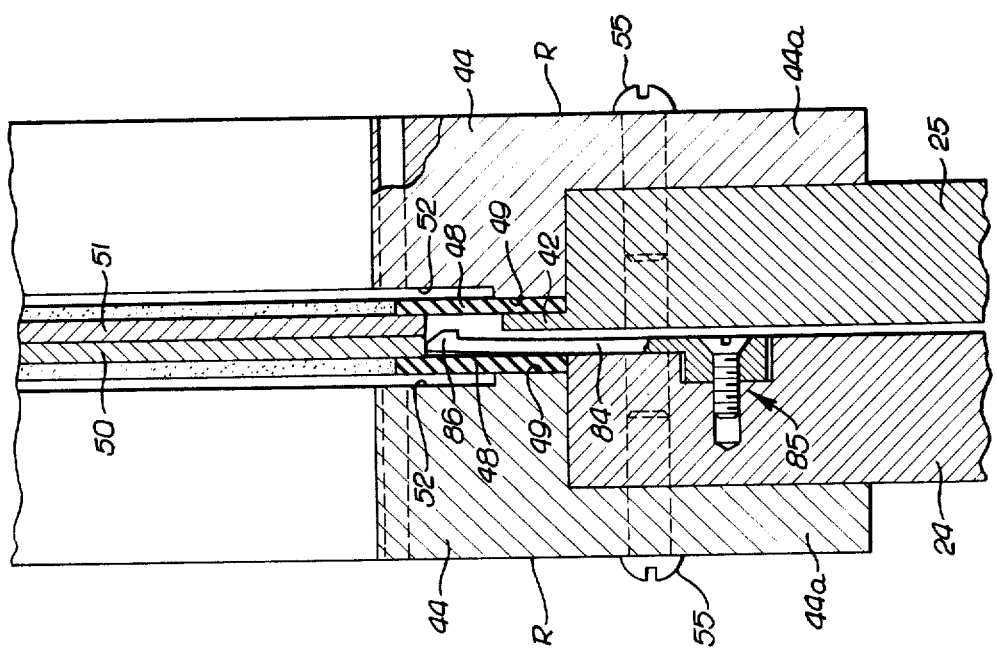
FIG. 5 is a detail section on line 5—5 of FIG. 4, with the master and copy photomask plates in contact.

Referring to FIGS. 3, 5 and 6, FIGS. 3 and 5 show the seals in their normal, parallel, undeflected positions, and FIG. 6 shows them flexed outwardly. The master and copy photomask plates 50 and 51, respectively, are shown between the innermost, flexible lip portions of the seals, and in face-to-face contact in FIGS. 3 and 5, but separated approximately 0.040 inch in the separated position of FIG. 6. The flat seal contacting surfaces 49 of the retainer frame parts 44 terminate in or adjoin a relieved or inset face 52, which enables outward flexing of the lip portions of the seals to accommodate, but limit, separation of the photomask plates 50 and 51 to the predetermined spacing distance, in this case, of 0.040 inch (FIGS. 5 and 6). As may be seen best in FIGS. 4, 5 and 6, the rectangular (usually square) retainer frame members 44 merge with segmental flange parts 44a to form the retainer R with a circular rim, and screws shown at 55 (FIGS. 5 and 6) fasten the retainers R to the frame plates 24.

Referring again to the aforementioned round access door 14, hinged on axis h, this door has affixed to its ring-shaped back the peripheral flange 60 of a retainer for a transparent plastic window 62. A hinge piece 61, comprised of a rectangular block 65, with an upstanding flange 66 at the front, engages a flattened bottom edge surface of the door (FIG. 4), the flange 66 overlapping and engaging a narrow portion of the door, just above its horizontal flattened edge. Screws 68 through the flange 66 fasten the hinge piece 64 to the narrow lower edge portion of the door (FIGS. 2, 3 and 4). Coaxial bores 69 extend inwardly into opposite ends of block 65, and receive hinge pins 70 projecting from hinge brackets 72 secured to the front of mounting plate 13.

Extending upwardly from inner end portions of bores 69 (FIGS. 3 and 4) are vertical vacuum passages 74 and 74a, which are continued by vacuum slots 75 and 75a, respectively, extending vertically through door 14 to the copy plenum chamber Cp just inside window 62, and defined further by the copy photomask plate 51 already mentioned.

The two hinge pins 70 and brackets 72 are bored to form two vacuum passages 76a and 76b, which meet vacuum passages 77 and 78 extending rearwardly through the brackets 72 and thence through mounting plate 13. To the passage 77 communicating with chamber Cp is coupled a vacuum supply line 81 leading from manifold M3. To the passage 78 is coupled a vacuum line 82 connected into master plenum chamber Cm, and including meter or gauge M, which may be a flow meter, or a differential pressure gauge. To the chamber Cm, defined by the master plate 50, the lens barrel 12, and the lens L, is coupled a vacuum line 83 leading from a manifold M1. Shunted across meter or gauge M is an extended loop leading to a shut-off valve V5.

The aforementioned seals 48 are shown in normal undeflected positions in FIGS. 3 and 5, the photomask plates 50 and 51 being then in contact. In FIG. 6, a vacuum has been drawn in the main chamber C between the plates 50 and 51, opening it, and higher vacuums have been drawn in master and copy chambers Cm and Cp, as more fully explained later. The vacuum differentials thereby created across the two pairs of elastomeric seals 48 and photomasks then cause a gradual separation between the plates to a final spacing distance of 0.040 inch, in this example. The flexible seals deflect and may compress slightly to accommodate this separation of the plates, and opening up of the main chamber C, as shown in FIG. 6. The separation distance is established as the abutment surfaces 52 are engaged by the outwardly flexed seals (FIG. 6).

In FIGS. 5 and 6 are shown one of a number of positioning tab arms 84 for the photomask plates 50 and 51. Several such tab arms 84 are mounted in slots formed in the confronting faces of the printing or locating frames 24 and 25. Outer ends of these tab arms are secured to the frames 24 and 25 at 85, and project inwardly therefrom to terminate in heads 86 formed with squared-off extremities adapted to engage the edges of the glass plates 50 and 51. The heads are preferably formed with a taper, as shown, to permit easy entry of the photomask plates therebetween. The tab arms also are cantilevered to permit a degree of flexibility or accommodation as the plates are inserted or removed. The diagonal orientation of the plates 50 and 51 and related parts is to afford enhanced security against the possibility that the plates may tip out and fall prior to their being clamped by the vacuums developed in the plenum chambers behind them. With reference to FIG. 4, the tab arms 84 shown in full lines will be understood to engage and support the master copymask 50; and those shown in phantom lines are those which engage and support the copymask 51, understood to lie, with its own tab arms 84, in front of the plane of the paper in FIG. 4. In the pattern used in the present embodiment of the invention, there are three tab arms 84 spaced along each of the two lower diagonal edges of the copy plates. In each such set of three, the middle tab arm is mounted on one of the printing frames, and the two outside tab arms are mounted on the other. Moreover, each frame mounts two of the tab arms along each diagonal, and one of the tab arms of the other. These holder tabs are useful while the printer is being loaded with the master and copy photomasks, and until the holding vacuums are drawn behind them. The tip or head ends of the tabs, however, continue their supporting engagement with the photomask plates, even in the fully depressed positions of the latter, as may be seen in FIG. 6.

Figure 9:
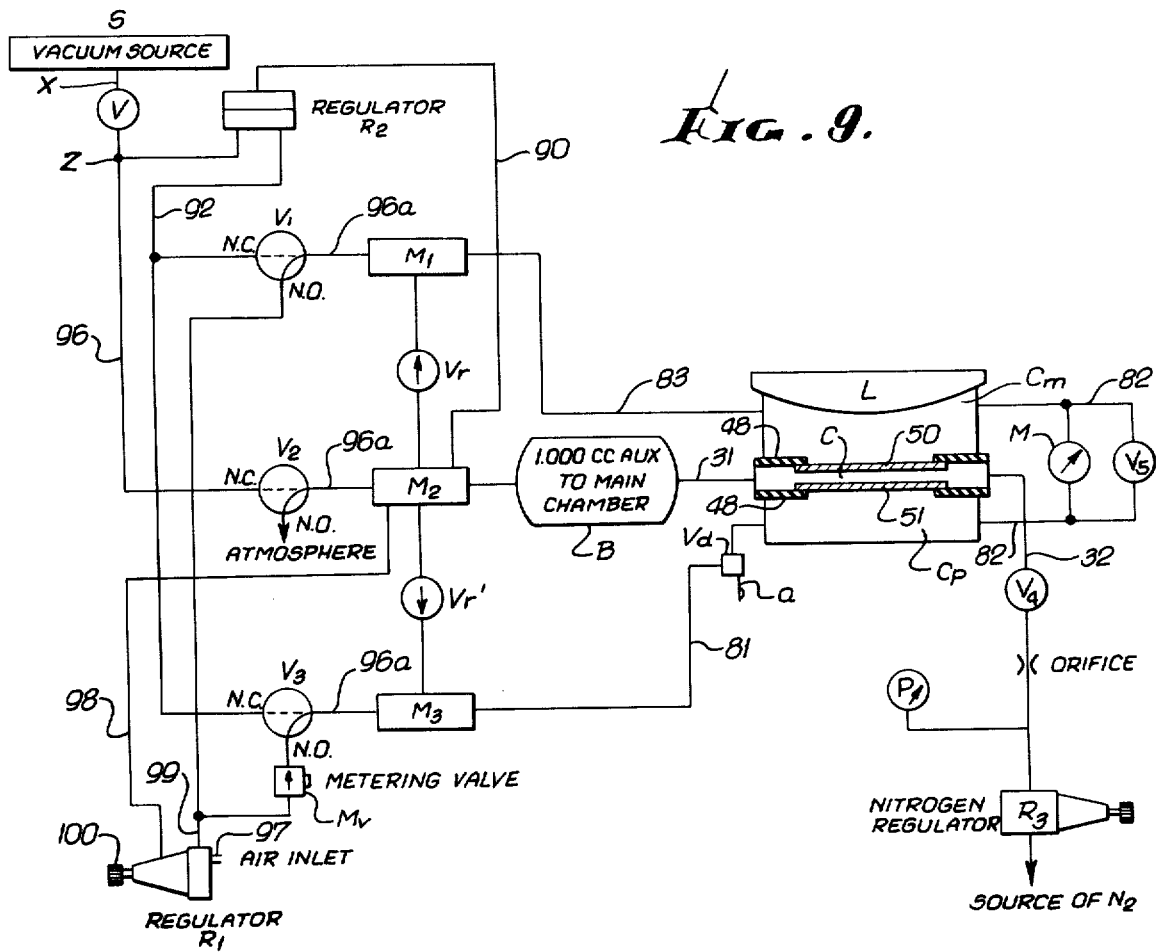
FIG. 9 is a diagram of the pneumatic control and actuating system of the invention.

Reference is next directed to the pneumatic system shown diagrammatically in FIG. 9. This figure shows the collimator lens L, the main chamber C, master plenum chamber Cm, copy plenum chamber Cp, the plates 50 and 51, and elastomeric seals 48.

A source of vacuum, indicated at S, is capable of drawing a vacuum in the system of something of the order of 25 inches Hg. The system has a chosen or predetermined capacity of this order, with all chambers, lines, etc. evacuated to 25 inches Hg. If, however, the main chamber C is evacuated to this maximum level, and the master and copy chambers are substantially less evacuated, but are suddenly opened to a higher vacuum derived from the source S, the chambers Cm and Cp are then rapidly further evacuated, a re-distribution of vacuums automatically occurring wherein available vacuum rapidly drops the pressure in chambers Cm and Cp. The flow impedance of the system from the vacuum source S via valve V3, etc., to chamber C is so designed as to impede or prevent maintenance of the vacuum of 25 inches Hg. in chamber C under this condition, and the vacuum in chamber C falls about 7–8 inches Hg. to a peak indicated at J in FIG. 8. This performance and its purpose will be described more fully hereinafter.

The vacuum source S mentioned above leads via a shut-off valve V to a vacuum regulator R2. This regulator has a reference vacuum line 90 going to a chamber vacuum manifold M2. A line from manifold M2 leads to a large (1000 C.C.) ballast chamber B, which is much larger than, but is auxiliary to, and really a large adjunct of, the aforementioned main chamber C between the photomask plates 50 and 51. The aforementioned vacuum line 31 from main chamber C connects chamber C with chamber B. A vacuum line 92 leads from regulator R2 to certain presently described valves V1 and V3. Valves V1 and V3, and an additional valve V2, are identical three-way valves, and stand normally in the deactuated positions designated by the passages therethrough shown in full lines. The ports at N.O. are open, those at N.C. are closed, and the connections are as represented in full lines. In the alternative actuated positions, shown in dash lines, the ports at N.O. are closed, and those at N.C. are opened, the passage through the valve being open along dashed paths to the vacuum lines beyond.

A vacuum line 96 leads to the N.C. port of valve V2, and the regulated vacuum line 92 leads to the N.C. ports of valves V1 and V3. Vacuum lines 96a connect vacuum manifolds M1, M2 and M3, with the valves V1, V2 and V3, respectively, which connect these lines to either the N.O. ports, when the valves are in normal position, or to the N.C. ports when these valves are actuated and the N.C. ports are then open.

The vacuum regulator R1 has an atmospheric air inlet at 97, and a vacuum reference line at 98 connected to manifold M2, and thence via chamber B to chamber C. In addition, a regulated vacuum line 99 leads from the regulator, and branches to connect with the N.O. ports of valves V1 and V3. A later-described metering valve Mv is included in the branch leading to the N.O. port of valve V3.

Pressure relief valves Vr and Vr' between manifold M1 and manifold M2, and between manifold M3 and manifold M2, maintain the vacuum in manifolds M1 and M3, and therefore in plenum chambers Cm and Cp, at vacuum levels of 5 to 6 inches Hg. below the vacuum in main chamber B during final repressurizing of the system, and thus maintain the photomasks separated at this time.

The two vacuum regulators R1 and R2 should now be considered. They are similar to conventional pressure regulators, the regulator R1 being adjustable, by a knob 100, to regulate or establish a selected differential pressure $\Delta p$. Regulator R2 is built to establish a fixed differential pressure $\Delta p'$. It references, via line 90, manifold M2, chamber B and chamber C, against the variable vacuum in chamber C, producing in its output line 92, a vacuum higher by 3 to 5 inches Hg. than the pressure in chamber C. Regulator R1 communicates at 97 with atmosphere, references via line 98, M2 and B to chamber C, and holds an adjusted vacuum level, or differential, relative to that in chamber C, via branching line 99 leading through V1 and V3, and M1 and M3, on to plenum chambers Cm and Cp, respectively. The regulator R1 is thus adjustable to control the height of this vacuum level, which may preferably be about 20 inches Hg. for "soft" plate contact, up to 0 inch Hg. for "hard" contact (both cases shown in FIG. 7). The adjustable regulator R1 can be set for any desired contact pressure between, in this case, 25 inches Hg. and 0 inch Hg.

The system of FIG. 9 is completed by a nitrogen purge system for the chamber C and parts in communication therewith, including the previously mentioned pneumatic purge line 32. This is controlled by a valve V4, ahead of which is an orifice, a pressure gauge, a nitrogen regulator R3, and a source of nitrogen, as diagrammed in FIG. 9.

With reference now additionally to the vacuum vs. time diagram of FIG. 8, the complete operation of the system is as follows. It will be observed that valves V1 to V5 actuate and de-actuate at various times along the time axis. These actuations and deactuations, and also the timing of exposure by ultraviolet light, are preferably under automatic control. Thus the valves V1 to V5 may all have solenoids for actuation and deactuation, and an electric circuit of any type may be used to operate them in desired sequence. For example, in FIG. 10, is diagrammatically represented a rotating clock-driven timer drum T which may make one revolution for each automatic cycle of operation of the system, typically of the order 35–40 seconds duration. The various events of the cycle, e.g., automatic actuations or deactuations of valves V1 to V5, as designated in FIG. 8, beginning at time 0 seconds, are automatically performed as this drum rotates. The drum could have conductive arcuate strips on its circumference, contacted by suitable brushes, or cams actuating microswitches controlling circuits containing valve actuating and deactuating solenoids. Or I may, in lieu of the drum, control such solenoids by time delay relays well known in the art. The details of many such expedients are within the knowledge of the art and need not be explained herein.

The cycle is as follows:

Assume first that the printer door is open, and all of valves V1 to V5 are deactuated, excepting that V4 may be actuated (open to nitrogen). The master and copy photomask plates are in place, and source vacuum is available, for example, by opening valve V. The plates are so dimensioned that the unflexed seals project very slightly beyond the opposed faces of the seal retainers before the vacuum is applied. It will be understood that these seals, when subject to vacuum differentials from behind them, i.e., under the influence of a vacuum developed in plenum chambers Cm and Cp, will deflect towards these respective chambers, each by a distance of 0.020 inch in the present case, opening up the center chamber C to a spacing distance of 0.040 inch.

To start, source vacuum is made available by, for example, opening a valve V, and valve V1 is actuated. Thus vacuum is communicated via regulator R2 and line 92 through valve V1, manifold M1 and line 83 to the vacuum chamber Cm. This regulator references its vacuum output to line 92 to the pressure sensed in chamber C (then atmospheric pressure) by means of line 90, manifold M2, chamber B and line 31. The regulator functions, as do regulators of the type, by drawing a vacuum of 2–3 inches Hg. in chamber Cm relative to pressure in chamber C. This vacuum differential in relation to the pressure (at first atmospheric) in chamber C, depresses master plate 50 and the corresponding seal 48 by 0.020 inch, as represented by pre-cycle time A'.

When the copy plate is loaded into the door, with the door open, and the door is then closed, V3 is actuated and V4 deactuated (closed). Conveniently, and as a feature of the invention, the actuation of valve V3 and deactuation of valve V4 is by an initial movement of the door, from fully open position back towards closed position. As diagrammatically indicated in FIG. 9, the vacuum line 81 contains a valve Vd including and operated by, for example, microswitch means whose actuating arm a is engageable by the hinged door 14 whenever the latter is wide open. Vacuum is cut off from chamber Cp by valve Vd whenever the door 14 is fully open. Thus, the door must be fully open during loading or removal of the copy plate. Also, the initial closure movement of the door operates, preferably through the microswitch means mentioned, and suitable circuitry, to actuate three-way valve V3 and deactuate valve V4. Or, these valves can be actuated manually at the indicated times. These operations draw a vacuum of 2–3 inches Hg., in relation to pressure in C (at first atmospheric), in the chamber Cp.

Upon actuation of nitrogen control valve V4 (FIG. 8), nitrogen is admitted to chamber C to purge it and its auxiliary parts with nitrogen, for a purpose understood in the art. After a suitable purging interval, at time zero of the timing cycle, designated at A in FIG. 8, valves V2 and V5 are actuated (V5 closing), and nitrogen purge valve V4 is deactuated. In the automatic system, the cycle is started by initiating rotation of the timer drum T from its start position of FIG. 10. By these actuations, the source of purging nitrogen is cut off by valve V4, chambers Cm and Cp are interconnected, and source vacuum is opened to flow through valve V2 to manifold M2, ballast chamber B, and line 31 to chamber C. The defining plates 50 and 51 of chamber C would be in contact excepting for the higher vacuum levels drawn in chambers Cm and Cp. The regulator R2, however, as already described, has acted through its output line 92, valves V1 and V3 (both now in actuated position), manifolds M1 and M3, and lines 83 and 81, to draw vacuums in chambers Cm and Cp which are greater than the vacuum in middle or main chamber C by a vacuum differential of 2–3 inches Hg. This differential acts across the plates 50 and 51 to depress and spread them apart, against the opposition of the elastomeric seals 48, by the predetermined maximum or limited spacing distance, in this case 0.040 inch. This spacing of the plates 50 and 51 enables the vacuum source to evacuate the chamber C very rapidly; and by the action of the regulator R2, the chambers Cm and Cp are continuously held at a vacuum differential of 2–3 inches Hg. higher than that in chamber C. The master and copy plates 50 and 51 are thus held apart at 0.040 inch spacing, from cycle time 0 seconds, at point A in FIG. 8, to about cycle time 7 or 8 seconds, as represented in FIG. 8. Finally, as evacuation of chambers Cm and Cp continues, the earlier described limited capacity of the vacuum source results in a reduction in the rate of evacuation of the main chamber C, and a failure of the regulator R2 (now wide open) to maintain the original differential of 2 to 3 inches Hg. in the chambers Cm and Cp. The vacuums in these chambers then progressively equalize with the vacuum in chamber C at, in the present case, 25 inches Hg. This is represented at E in FIG. 8. This results in the deformed elastomeric seals moving the plates 50 and 51 slowly into contact.

Thereafter, the 25 inches Hg. vacuum in chamber C is held substantially steady along EF, while the chambers Cm and Cp are backfilled with air (vacuum dropped) by deactuation of valves V1 and V3, and atmospheric air entering regulator R1 at 97. Since plenum chambers Cm and Cp are of different volumes, equal rates of back-filling thereof would not, without special attention, produce equal vacuums in these chambers, as normally required, resulting in an evident acute problem. To meet this problem, an adjustable metering valve Mv in the branch of line 99 that leads from the regulator R1 to port N.O. of valve V3 is adjusted to regulate the flow into plenum chamber Cp (which is the smaller of the two) in such relation to the flow into chamber Cm as to equalize the pressures in the chambers Cm and Cp. The meter or gauge M connected between the chambers Cm and Cp can be a differential pressure gauge indicating any differences in pressure between the chambers. Its indication facilitates adjustment of metering valve Mv. An alternate way of indicating pressure differences is to use, for the meter M, a flow rate meter. I may use for this purpose two conventional flow rate meter units arranged in series, but reversed end to end relative to each other. Any flow of air thus indicated would again be the result of an existing pressure difference, however transient.

Figure 8:
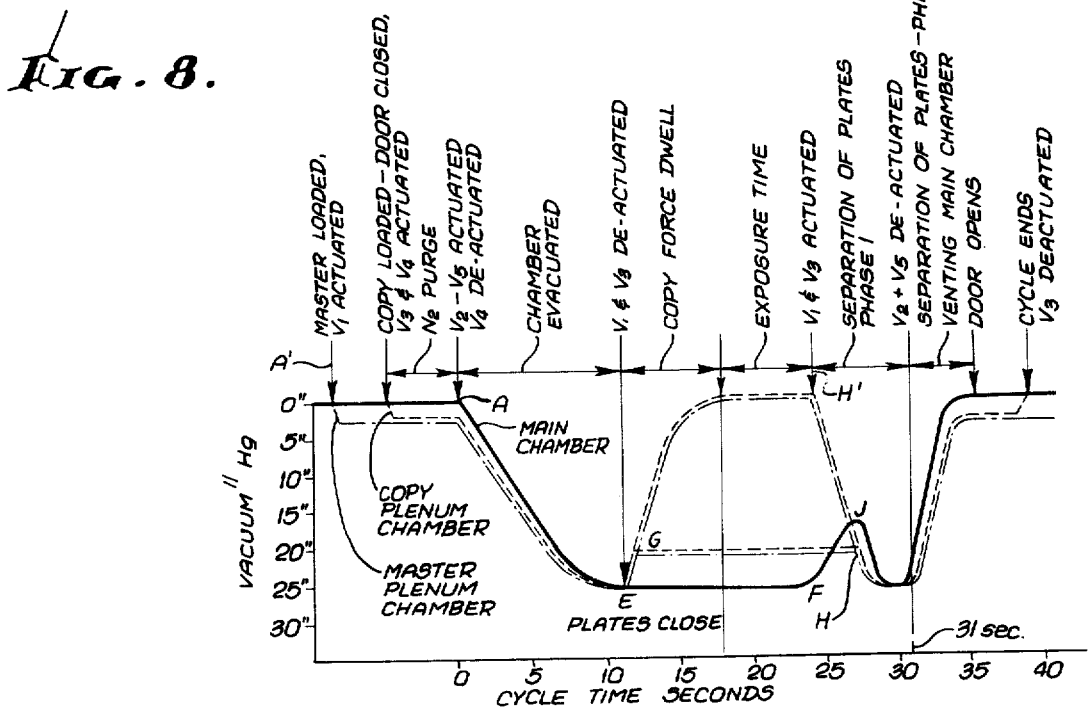
FIG. 8 is a diagram of vacuum in inches of mercury (Hg. inches) vs. time in seconds, and designating vacuum in various parts of the system at different times in a cycle of operation, as well as times of actuating and de-actuating of certain valves to control the events of the cycle.

Thus, once the evacuation period has terminated, at E in FIG. 8, valves V1 and V3 are deactuated, and while vacuum is held substantially steady at 25 inches Hg. in chamber C, along E to F of FIG. 8, chambers Cm and Cp are being back-filled with air, taken in from atmosphere at air inlet 97 of regulator R1 and conveyed via valves V1 and V3 to the chambers Cm and Cp. The vacuum in these chambers decreases from E to G, or say to H', depending upon the adjustment of regulator R1. FIG. 8 best illustrates backfilling with air to H'. Of course, the reduced vacuum level can be set by the regulator R1 at any point up the slope from E. This vacuum drop is preferably about 5 inches Hg., as to G, but selectively to any level, as to 0 inch Hg. in FIG. 8. With back-filling to G, 20 inches Hg., a soft type contact of the plates, 5 inches Hg., is established and they are pressed together with this pressure. This limit on the pressure forcing the plates together avoids defects generated by excessive clamping force. Dirt particles can be ground into the master and copy due to excess copy force, and this feature avoids such problem.

It is at this time, during back-filling of chambers Cm and Cp, with contact pressures forcing the plates together, that it is important to monitor and regulate the pressures in these chambers to equalize with one another, as described earlier. It will be seen that if, during exposure, the pressures in the chambers Cm and Cp are not equalized, the differential between them will bow the plates, with known run-in or run-out consequences, generally undesirable, though possibly, in special cases, useful. Any bowing of the contacting plates during this phase of the cycle will of course be maintained during exposure.

The selected copy force or pressure differential having been developed and applied, the plates remain under the selected pressure for a few seconds, as indicated, as to about cycle time 17 seconds, at which time exposure begins (initiated by a pre-set timer). Assuming the hard contact example with vacuum reduction to 0 inch Hg., exposure continues to H', at which time valves V1 and V3 are actuated, pulling progressively increasing vacuums in master and copy plenum chambers Cm and Cp. Air from these chambers is returned via the lines 83 and 81, manifolds M1 and M2, valves V1 and V3, and back through the regulator to the vacuum intake line supplied from source S. The internal vacuum lines, such as inside of point Z, have a designed large flow impedance such as to impede outflow of this air back through the relatively open or low impedance source line at X, leading to the nearly zero output impedance source S, which in practice is simply the outlet of a vacuum pump capable of developing a vacuum preferably of the order of 25 inches Hg. Air in the internal system suddenly evacuated from chambers Cm and Cp hence does not exit instantly to the vacuum source. In result, the sudden opening and evacuation of chambers Cm and Cp causes a vacuum re-distribution to take place, with air from the vacuum chambers Cm and Cp coming through valve V2, eventually causing the pressure in chamber C to rise, and to peak as at J. The pressures in chambers Cm and Cp fall below this peaking middle chamber pressure peak J, and the plates 50 and 51 are accordingly again subjected to separation forces. The main chamber vacuum thus at this time falls and is exceeded by several inches of Hg. by the vacuums in chambers Cm and Cp, which, under control of regulator R2, reach 25 inches Hg. Under these again reversed conditions, with higher vacuums in chambers Cm and Cp than in chamber C, the plates 50 and 51 again gently separate. The vacuum in chamber C shortly recovers to 25 inches Hg., so, at about cycle time 30 seconds, there are no pressure differentials between chambers.

At the approximate cycle time 31 seconds, valves V2 and V5 are deactuated, valve V2 opening to atmosphere to allow chamber C to re-pressurize. The relief valves Vr and Vr' allow Cm and Cp to re-pressurize, but with 5 inches of vacuum higher than main chamber vacuum. This affords additional force to press the plates against their seals, assuring the desired maximum separation space of 0.040 inch. Thus the main chamber C returns to atmospheric pressure, but the master and copy chambers decrease in such a manner as to hold, at least for a time, 5–6 inches Hg. Finally, as atmospheric pressure is approached in the main chamber, the differential of 2–3 inches Hg. is restored in chambers Cm and Cp. The copy chamber drops to atmospheric pressure when the door is opened, and the 2–3 inches Hg. vacuum in master chamber Cm can be held for additional printing cycles. The exposed copy photomask plate is removed and replaced while the door is open, and the cycle can be repeated.

Some of the more significant features and accomplishments of the invention may now be briefly enumerated.

First, the master and copy plates are separated when the hinged door is closed, so there is no sliding or scuffing of these plates on one another as the door is closed.

Second, the master and copy plates remain separated during the evacuation of air from between the two plates. Thus, a very fast evacuation can be effected without the usual trapping of a bubble of air between the two plates, such as would otherwise prevent good contact all over the plate surfaces.

The master and copy photomask plates are placed into contact only after the entire chamber system has been completely pumped down. Thus any shifting which might occur due to mechanical stress created by the application of vacuum is not transferred to the master or copy plates.

The plate contact force is gently and uniformly applied to the plates, being generated by allowing air pressure to act directly against the back surfaces of the master and copy plates. The master and copy plates are free-floating during the application of this force.

An important feature and accomplishment is the controlled regulation of the pneumatically applied forces to the back surfaces of these plates.

The system employs a novel positive separation of the master and copy plates prior to opening the housing door. This follows from a novel sequence wherein a partial vacuum is applied to the back sides of the master and copy plates, pulling them apart, and a back-filling of the central chamber, between the plates, pushing them apart. This unique combination of pulling and pushing in a controlled sequence provides the positive separation inherent in the invention.

Features to be especially noted thus include the intentional cross-over of the vacuum influences, the method of separation with regard to the two-step function of the master and copy plate separation, and the equalization of pressures in the master and copy plenum chambers during the application of copy force.

With especial attention to the seals, the utilization of the fabric reinforced rubber or neoprene seals to maintain gentle contact with effective sealing to the glass is a unique feature. Also, the large ballast chamber B, when evacuated, will, in event of leakage of either of the cantilevered rubber seals, apply a vacuum to the leaking seal and immediately re-seal it.

The process and system as disclosed herein and in the drawings are illustrative of and not restrictive on the invention, and the illustrative process and system are subject to modification within the scope of the invention as defined in the appended claims. It should also be understood that the particular type of chrome-surfaced photomasks suggested herein, the resist used, and the ultraviolet radiation mentioned, can be replaced by other types, involving emulsions, and using other parts of the spectrum, as green, are equally within the scope of the invention and the claims.

What is claimed is:

1. A contact printer for printing a photomask copy plate from a photomask master plate, comprising:
    a closeable vacuum-tight contact printer housing for containing, in face-to-face opposition and alignment, a photomask master plate and a photomask copy plate, with said plates arranged for contact with one another during printing, or to be spread slightly apart at other times, but in continued parallelism, there being a vacuum space outwardly around said plates while said plates are either in contact or spread apart, said space, together with space between the plates constituting a main vacuum chamber,
    elastically deformable elastomeric seals in unbroken contact with marginal areas of said plates on the oppositely facing outer sides thereof, said seals and plates normally occupying relative positions with the plates in mutual contact, and the elastic seals thereadjacent relatively elastically undeformed,
    two partition wall structures mounted vacuum tight on the inside of said housing and extending generally transversely of said housing, in parallelism with said plates, said partition wall structures having abutment surfaces facing toward one another, outside said elastomeric seals, said seals confronting and being adapted to engage, substantially elastically deform, and thereby seal to said abutment surfaces when said plates are spread apart as aforesaid,
    at least the one of said partition wall structures associated with the master photomask plate being apertured inwardly of said elastomeric seals for exposure of the plates to contact printing radiation,
    pneumatic passage means communicable with said main vacuum chamber,
    said housing containing sealed outer vacuum chambers communicating with and partly defined by the oppositely facing surfaces of said plates, and
    pneumatic passage means communicating with said two outer vacuum chambers.

2. The printer according to claim 1, including a meter connected between the two last-mentioned chambers to indicate relative vacuum build-up therein.

3. The printer according to claim 1, including a pneumatic line for connection of an external source of vacuum to said first-mentioned pneumatic passage means; and means adapted for connection to said source of vacuum, including regulator means for delivering a higher level of vacuum to said two last-mentioned vacuum chambers.

4. The printer according to claim 1, wherein said elastomeric seals comprise frame-like members normally in planes parallel to said plates and contacting oppositely facing marginal areas thereof around said plates, and
    clamping means in vacuum-tight relation to the interior of said housing clamping the outer marginal edge portions of said seals fixedly to said housing, said seals embodying unclamped inwardly projecting resiliently yieldable lip portions engaging marginal portions of said plates around the oppositely facing surfaces thereof.

5. The process of contact printing a photomask copy plate from a photomask master plate within a sealed housing of a contact printer, and containing a window for entrance of printing radiation, that includes:
    supporting said plates in mutual contact, in the field of said radiation, between elastically deformable elastomeric seals contacting the oppositely facing outside faces of said plates continuously around the margins thereof, said elastomeric seals being elastically deformable to permit separation of said plates and thereby enlargement of a central vacuum chamber space around and between said plates in response to application to the oppositely facing surfaces of said plates of incrementally higher vacuums than a vacuum existing in said central vacuum chamber space,
    applying an increasing vacuum to said central vacuum chamber, and incrementally higher increasing vacuums to the oppositely facing surfaces of said plates, to the extent that said surfaces limitedly separate,
    limiting the vacuums developed in said central vacuum chamber space and applied to the oppositely facing surfaces of said plates to a common predetermined maximum level, whereby said elastomeric seals return from their relatively deformed to their normal relatively undeformed states, and said plates return toward their initial contacting positions,
    thereafter holding a vacuum in said central vacuum chamber in a relatively steady state while reducing the vacuums applied to the opposite surfaces of said plates to a predetermined lower level, whereby a resultant pressure differential acts to force said plates against one another for a dwell period,
    exposing said photomask master and copy plates to radiation for a following exposure period,
    progressively increasing the vacuums applied to the oppositely facing outside surfaces of said plates,
    reducing the vacuum in said central vacuum chamber space to a level exceeding the increasing vacuum applied to said oppositely facing outside surfaces of the plates, whereby the plates again separate, and
    thereafter progressively lowering the vacuum in said central chamber to atmospheric pressure, and at the same time lowering the vacuums applied to the outside surfaces of said plates, but with maintenance of an added increment of vacuum application to said outside surfaces.

6. The contact printer according to claim 1, including:
    a vacuum source line system adapted for connection to an external vacuum source, and including a connection with said first-mentioned pneumatic passage means; and a vacuum regulator having a source connection to said vacuum source line system, a vacuum reference connection to said main vacuum chamber, and a regulated vacuum control connection and line communicating with said second-mentioned pneumatic passage means.

7. The contact printer according to claim 1, including:
a vacuum source line system adapted for connection to an external vacuum source of a predetermined vacuum drawing capacity, said source line system including a connection with said first-mentioned pneumatic passage means and thence with said main vacuum chamber, and
a vacuum regulator having a source connection to said vacuum source line system, a vacuum reference line connection communicable with said main vacuum chamber, and having also a vacuum regulation line connection, and
branching lines leading from said regulation line connection communicable, one with each of said outer vacuum chambers, said regulator being adapted to draw in said outer chambers vacuum levels initially exceeding by a predetermined differential the vacuum in said main chamber, but finally equalizing with said vacuum in said main chamber as the external vacuum source reaches its said capacity.

8. The printer according to claim 7, including also:
a normally closed valve in a line of said source line system communicating with said pneumatic passage means to said main vacuum chamber, said valve adapted for actuation to open said last-mentioned line of said system from said source to said main chamber, and upon deactuating to close said source line containing said valve and open said pneumatic passage means to atmosphere, and
normally closed valves in said line branches adapted for actuation to open said branches to said outer vacuum chambers, and upon deactuation to close off said branches from said regulator, and to open the portions of said branches between said valves and said outer vacuum chambers to intake of atmospheric air.

9. The printer according to claim 8, including, for control of said intake of atmospheric air, a pressure regulator having an air intake opening exposed to atmospheric air, a reference vacuum line from said regulator arranged for sensing vacuum in said main vacuum chamber, and
air supply lines for delivering atmospheric air from said regulator, at predetermined vacuum levels below vacuum sensed in said main chamber, under on-and-off control of said valves in said branches of said regulation line, to said outer vacuum chambers, whereby to reduce vacuum levels in said outer chambers to predetermined levels below that existing in said main chamber, thereby to cause said plates to be compressed against one another.

10. The printer of claim 9, wherein said pressure regulator is of the type adjustable as for the magnitude of the pressure differential established between intaken atmospheric air, and air delivered from said regulator to said outer vacuum chambers.

11. The printer according to claim 9, including a metering valve in at least one of said air supply lines leading from said pressure regulator to a corresponding outer vacuum chamber.

12. The printer according to claim 11, including a meter connected between said two outer chambers to monitor the relative buildups of vacuum therein.

13. The printer of claim 9, characterized by internal vacuum lines and connections of relatively high flow impedance, whereby to impede outflow of air through the relatively low impedance vacuum source.

14. The printer according to claim 4, wherein said printer housing is split into two parts generally in a plane parallel to and located between said photomask master and copy plates, with one part hinged to the other to close thereagainst,
means for sealing and locking said parts to one another when in closed position, and
means for holding vacuums in said two outer vacuum chambers to depress said plates and seals during relative closing movement of said hinged housing parts to prevent scuffing of said plates by contact therebetween.

15. The process of contact printing a photomask copy plate from a photomask master plate within a sealed housing of a contact printer, and containing a window for entrance of printing radiation, that includes:
supporting said plates in mutual contact, in the field of said radiation, between elastically deformable elastomeric seals contacting the oppositely facing outside faces of said plates continuously around the margins thereof, said elastomeric seals being elastically deformable to permit separation of said plates and thereby enlargement of a central vacuum chamber space around and between said plates in response to application to the oppositely facing surfaces of said plates of incrementally higher vacuums than a vacuum existing in said central vacuum chamber space,
applying an increasing vacuum to said central vacuum chamber, and incrementally higher increasing vacuums to the oppositely facing surfaces of said plates, to the extent that said surfaces limitedly separate,
limiting the vacuums developed in said central vacuum chamber space and applied to the oppositely facing surfaces of said plates to a common predetermined maximum level, whereby said elastomeric seals return from their relatively deformed to their normal relatively undeformed states, and said plates return toward their initial contacting positions,
thereafter holding a vacuum in said central vacuum chamber in a relatively steady state while reducing the vacuums applied to the opposite surfaces of said plates to a predetermined lower level, whereby a resultant pressure differential acts to force said plates against one another for a dwell period, and
exposing said photomask master and copy plates to radiation for a following exposure period.

16. The process of contact printing a photomask copy plate from a photomask master plate within a sealed housing of a contact printer, and containing a window for entrance of printing radiation, that includes:
supporting said plates in mutual contact, in the field of said radiation, between elastically deformable elastomeric seals contacting the oppositely facing outside faces of said plates continuously around the margins thereof, said elastomeric seals being elastically deformable to permit separation of said plates and thereby enlargement of a central vacuum chamber space around and between said plates in response to application to the oppositely facing surfaces of said plates of incrementally higher vacuums than a vacuum existing in said central vacuum chamber space, applying an increasing vacuum to said central vacuum chamber, and incrementally higher increasing vacuums to the oppositely facing surfaces of said plates, to the extent that said surfaces limitedly separate, limiting the vacuums developed in said central vacuum chamber space and applied to the oppositely facing surfaces of said plates to a common predetermined maximum level, whereby said elastomeric seals return from their relatively deformed to their normal relatively undeformed states, and said plates return toward their initial contacting positions, thereafter holding a vacuum in said central vacuum chamber in a relatively steady state while reducing the vacuums applied to the opposite surfaces of said plates to a predetermined lower level, whereby a resultant pressure differential acts to force said plates against one another for a dwell period, exposing said photomask master and copy plates to radiation for a following exposure period, progressively increasing the vacuums applied to the oppositely facing outside surfaces of said plates, and reducing the vacuum in said central vacuum chamber space to a value lower than that reached by the increasing vacuum applied to said oppositely facing outside surfaces of the plates, whereby the plates again separate.

* * * * *